United States Patent [19]

Klein et al.

[11] 3,865,075

[45] Feb. 11, 1975

[54] SLAB IMPREGNATION APPARATUS

[75] Inventors: James H. Klein, Mattituck; Anthony J. Romano, Kings Park; Lawrence E. Kukacka, Port Jefferson; Joseph J. Fedelem, Blue Point, all of N.Y.

[73] Assignee: The United States of America as represented by the United States Atomic Energy Commission, Washington, D.C.

[22] Filed: Oct. 4, 1973

[21] Appl. No.: 403,586

[52] U.S. Cl. ............... 118/50, 404/75, 404/107
[51] Int. Cl. ............................................. B05c 9/08
[58] Field of Search ........ 118/50, 201, 300; 404/75, 404/92, 101, 107, 111; 222/402.1; 52/309; 61/36 R, 63, 11 S, 404

[56] References Cited
UNITED STATES PATENTS

| | | | |
|---|---|---|---|
| 2,474,567 | 6/1949 | Applegate | 118/50 |
| 3,540,837 | 11/1970 | Pascucci | 61/36 R |
| 3,567,496 | 3/1971 | Steinberg et al. | 52/309 |
| 3,604,213 | 9/1971 | Parsons | 61/36 R |

*Primary Examiner*—Mervin Stein
*Assistant Examiner*—Douglas A. Salser
*Attorney, Agent, or Firm*—John A. Horan; Leonard Belkin

[57] ABSTRACT

Apparatus for the repair of a concrete section comprising an impregnation device to impose a slight vacuum over the affected area and probes to inject a monomer mixture which polymerizes in situ to produce a repaired section which can be returned to normal service.

7 Claims, 2 Drawing Figures

3,865,075

SLAB IMPREGNATION APPARATUS

BACKGROUND OF THE INVENTION

The invention described herein was made in the course of, or under a contract with the U.S. Atomic Energy Commission.

A recent investigation indicates that about 89,000 of 563,000 bridges that were inspected were found to be defective. The most frequently encountered structural problem was that of cracked and deteriorated concrete bridge decks. Simple calculations reveal the potential expense involved in repairing these concrete decks and other concrete roadway surfaces by replacing the damaged concrete sections with new concrete according to conventional repair techniques as well as the considerable time involved in permitting the new concrete to set and cure before traffic is permitted to resume.

During the past few years there has been interest in so-called polymer-impregnated-concrete (PIC) such as described in U.S. Pat. No. 3,567,496 as a means of providing concrete which has greater resistance to such wear and tear and would be expected to have a longer useful life when used in highway and bridge construction. It has been suggested that new concrete and roadway construction could with proper development utilize PIC to obtain construction which will require less frequent repair. However, the problem of repairing existing concrete structures is a severe one which heretofore has not been susceptible to easy solution.

SUMMARY OF THE INVENTION

The present invention relates to the repair of damaged concrete by impregnating the latter with polymerizable monomer mixture for creating in situ polymer-impregnated concrete.

In accordance with a preferred embodiment of this invention there is provided an impregnation plate with a rim for contacting the slab of concrete to be impregnated forming therewith a closed chamber, one or more hollow closed probe tubes extending through the impregnator plate into holes previously prepared in the concrete slab, the tubes having holes in bottom thereof beneath the surface of the slab, means for maintaining a negative pressure, that is a pressure below atmospheric, within the chamber, and simultaneously injecting through the probe tubes a polymerizable monomer mixture into the damaged concrete, the monomer mixture replacing air within the concrete being removed as a result of the vacuum maintained. When the damaged concrete is saturated with the monomer mixture the latter is permitted to polymerize in situ, forming in effect a repair of the damaged concrete section.

It is thus a principal object of this invention to provide for the repair of a damaged concrete section by the impregnation of a polymerizable monomer composition for in situ curing.

Other objects and advantages of this invention will hereinafter become obvious from the following description of a preferred embodiment of this invention.

DESCRIPTION OF THE PREFERRED EMBODIMENT

Figure 1:
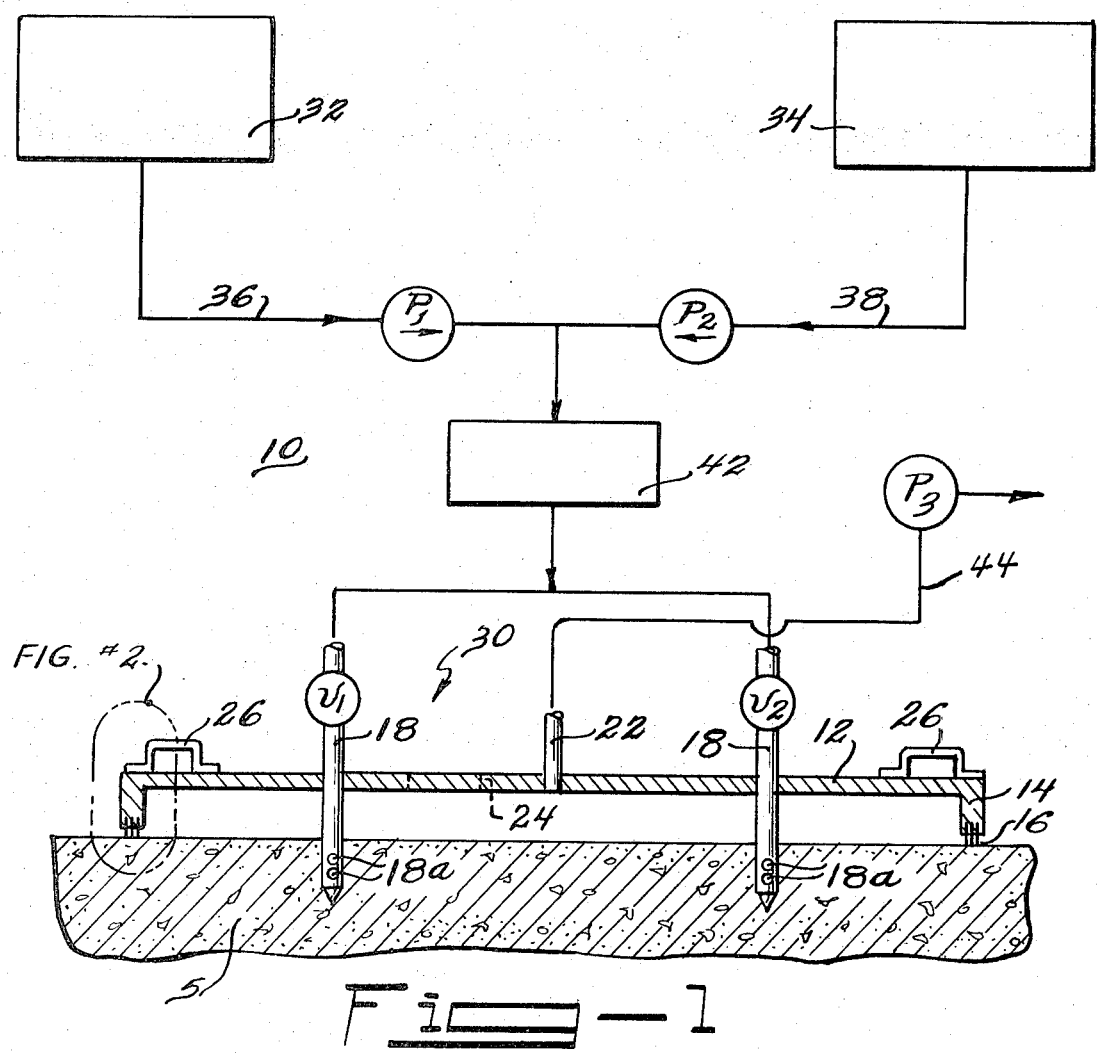
FIG. 1 is a partial section view in elevation and a partial schematic of a preferred embodiment of this invention.

Referring to the figures, there is shown a deteriorated section 5 of concrete which is to be impregnated with an in situ prepared polymer. For this purpose is illustrated an impregnation system 10 consisting of a flat impregnator plate 12 of square configuration, although other shapes could be utilized for certain applications, with lip or rim 14 having seals 16 of rubber or other suitable material in contact with the face of the concrete. Plate 12 is provided with a plurality of injection probes 18 having openings 18a at the bottom thereof extending into the concrete as illustrated, one or more tubes 22 for a purpose to be later described, one or more sight windows 24, and handles 26. The assembly as just described consisting of plate 12 and its various appendages and features is referred to for convenience herein as impregnator 30, and the latter is placed on the section of concrete to be impregnated, as will be more particularly described further below.

In order to supply the proper monomer mixture to impregnator 30, there is provided a pair of pots or tanks 32 and 34 containing appropriate first and second monomer mixtures as will be more particularly described below connected by way of lines 36 and 38 and pumps $P_1$ and $P_2$, respectively, to deliver the monomer mixtures through a mixer 42 to injection probes 18. Mixer 42 may be an ordinary cylindrical chamber in which mixing can occur. If desired baffles may be employed therein to enhance the mixing. The entrances to probes 18 are provided with shut off valves $V_1$ and $V_2$.

In order to facilitate the flow of monomer mixture throughout deteriorated concrete 5, a slight negative pressure or vacuum is maintained within the volume enclosed by impregnator plate 12. This is accomplished by a continuously operating vacuum pump $P_3$ connected by way of line 44 to tube or tubes 22 to maintain this reduced pressure condition. Air which is entrapped in the concrete is displaced by the monomer mixture flowing out of holes 18a in probes 18 and is removed by pump $P_3$.

Figure 2:
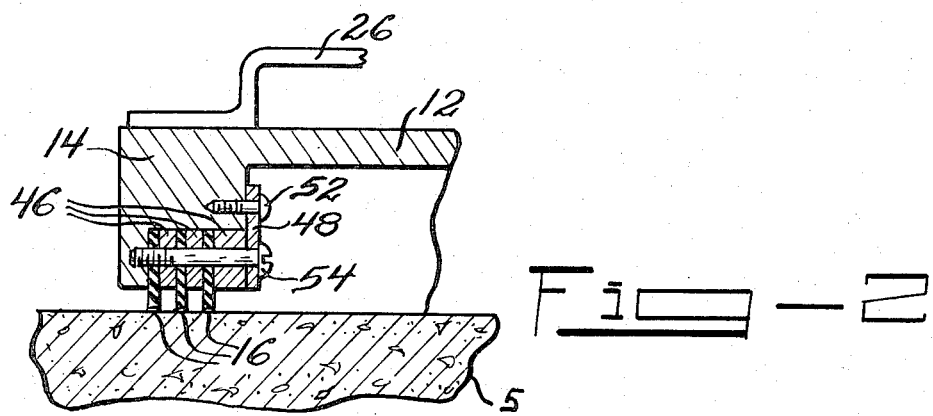
FIG. 2 is a detail taken from FIG. 1.

In order to insure proper sealing along the periphery of impregnator 30, as more particularly illustrated in FIG. 2, rim 14 may be provided with stacked spacers 46 sandwiching rubber seals 16 and held together by a plate 48 and screws 52 and 54.

In the operation of the apparatus described, a section of deteriorated concrete is selected for impregnation and holes are drilled into the concrete to accommodate probes 18. The depth to which probes 18 are inserted is not considered critical as due to the presence of the negative pressure the monomer composition will generally penetrate the surrounding volume. However, it has been found that penetration of the probe to the depth of the deteriorated concrete up to about 9 inches has been found to give the best results. It has also been found that no edge effect has developed, that is, the existence of atmospheric pressure in the concrete immediately outside the region covered by impregnator 30 does not interfere with the operation of the device as described.

With the use of handles 26, impregnator 30 is placed over the selected concrete section and probes 18 are pushed into previously prepared holes in the concrete. Pump $P_3$ is actuated to provide the negative pressure and then pumps $P_1$ and $P_2$ are actuated to supply the monomer mixture to probes 18. Valves $V_1$ and $V_2$ would be opened. Flow of monomer mixture is terminated when through sight hole 24 it is evident that the concrete is saturated and fluid is accumulating on the top surface of the concrete. Valves $V_1$ and $V_2$ are closed, pump $P_3$ deenergized, and impregnator 30 removed. Excess composition on the top surface of the concrete may then be wiped away. Polymerization in situ may be complete within a few hours after which traffic over the repaired area may be resumed. With regard to the amount of monomer absorbed in the concrete, it has been found that the monomer mixture loading is generally in the range of 5–20% by weight depending upon the degree of concrete deterioration.

With regard to the composition of the monomer mixtures which can be employed with the apparatus described, any commercially available suitable compositions which when mixed together will polymerize over a reasonable time period such as an hour or more in situ under ambient conditions can be used. The following describes examples of specific compositions of monomer mixtures which were employed successfully in accordance with this invention.

The monomer mixing system is basically a so-called "two-pot" system consisting of:

Pot No. 1 (i.e., tank 32) — contains half the monomer plus all of the initiator (or initiators)

Pot No. 2 (i.e., tank 34) — contains half the monomer required plus all of the promoter (or promoters)

Upon combining the two mixtures, the promoter decomposes the initiator which creates "free-radicals" and heat. Free-radicals begin polymerization reaction by reacting with monomer. Heat accelerates the reaction.

Two typical monomer systems successfully tested were:

|   | Monomer | Initiator(s) | Promoter(s) |
|---|---|---|---|
| 1. | Methyl methacrylate | Benzoyl peroxide, Azo-isobutyronitrile | Di methyl-aniline, p-toluidene |
| 2. | 80% styrene-20% polyester | Methylethyl-ketone peroxide | Cobalt naphthanate |

The foregoing monomers, promoters, initiators and their mixtures are well known in the art and commercially available. Other monomer compositions may be selected. The exact percentages of promoter or initiator employed depends upon ambient temperature conditions. A typical range is one-half to 2% by weight, for ambient temperature ranging from 95° to 50° F, respectively. The vacuum applied is not critical but it is found that a very slight negative pressure, of the order of 1 inch Hg, is usually quite satisfactory.

It is thus seen that there has been provided a way of repairing deteriorated concrete without removing the affected section and replacing it with new concrete. The arrangement is simple, economical, and productive of repairs with a minimum time. The repaired section at the same time due to the presence of the in situ polymer should be stronger and be more resistant to wear than the original concrete section.

What is claimed is:

1. Apparatus for impregnating a slab of concrete with a liquid mixture comprising:
   a. impregnator means for contacting said slab of concrete and forming therewith a closed chamber;
   b. hollow injector probe means extending through said impregnator means and terminating within said slab of concrete, said probe means having openings at the end thereof terminating within said slab;
   c. means for maintaining a negative pressure within said closed chamber; and
   d. means for simultaneously supplying said liquid mixture to said probe means for delivering said mixture within said slab of concrete, said liquid mixture within said slab effectively displacing air being removed by said negative pressure maintaining means.

2. The apparatus of claim 1 in which said impregnator means consists of a plate having an extended annular rim for contacting said slab of concrete.

3. The apparatus of claim 2 in which said rim includes sealing members to help maintain the vacuum within said chamber.

4. The apparatus of claim 2 in which said means for maintaining the negative pressure within said closed chamber consists of a conduit extending through said plate and a pump connected to said conduit for exhausting air from said chamber.

5. The apparatus of claim 4 in which said means for supplying liquid mixture to said probe means comprises a pair of pots containing the liquids to be mixed and means for mixing said liquids.

6. The apparatus of claim 5 in which said liquid mixture is a composition which will polymerize in situ under ambient conditions of use.

7. The apparatus of claim 4 in which said probe means extends into said slab of concrete up to a depth of about 9 inches.

* * * * *